July 5, 1966 L. J. SIENKIEWICZ 3,259,689

TELEVISION APPARATUS FOR LOCALLY TRANSMITTING THE DETECTED AUDIO SIGNAL

Filed April 30, 1962 4 Sheets-Sheet 1

July 5, 1966 L. J. SIENKIEWICZ 3,259,689

TELEVISION APPARATUS FOR LOCALLY TRANSMITTING THE DETECTED AUDIO SIGNAL

Filed April 30, 1962 4 Sheets-Sheet 2

3,259,689
Patented July 5, 1966

3,259,689

TELEVISION APPARATUS FOR LOCALLY TRANSMITTING THE DETECTED AUDIO SIGNAL

Leon J. Sienkiewicz, Metuchen, N.J., assignor to Westinghouse Electric Corporation, East Pittsburgh, Pa., a corporation of Pennsylvania

Filed Apr. 30, 1962, Ser. No. 191,116
5 Claims. (Cl. 178—5.8)

This invention relates to a new and improved sound system for a television receiver, and more specifically to a television receiver wherein the sound portion of the television program can be selectively retransmitted locally on a radio frequency carrier to be received locally by a radio frequency receiver.

In patent application Serial No. 181,591, entitled "Television Apparatus," filed March 22, 1962, in the name of Joseph W. Percival, there is disclosed a television receiver having a local low power radio frequency transmitter for transmitting the television sound preferably in the broadcast band. In the system disclosed in that patent applicaiton, the sound of the television receiver can either be produced locally by the conventional amplifying and speaker system of the television receiver or the sound channel of the television receiver can be deactivated and the sound transmitted by a local low power oscillator so as to be received by a radio frequency receiver such as a broadcast receiver. As disclosed in this identified application, this enables any one remote from the television receiver to receive the sound portion of the television program so that the volume can be controlled by the volume control of a remote broadcast receiver. Additionally, it enables one to view and hear the television program without the sound being heard by any one in the viewing area when utilizing an earplug in a broadcast receiver such as a conventional portable transistorized receiver. Such a system has many advantages such as for use in a hospital room, a housewife who must be remote from the viewing area but still would like to hear the sound portion of the program and possibly return to the viewing area when the programming material is primarily of visual interest so as to establish continuity of the program material. This system also enables each person to control the sound volume or tone separately from other viewers.

In the present invention, the above-mentioned radio frequency transmission of the sound portion of the television program is accomplished by utilizing the conventional sound channel amplifier to provide the power for actuating the radio frequency oscillator or transmitting means. Further, a simple switch is utilized to convert the power amplifier of a conventional television set to a power source for the oscillator.

Accordingly, an object of the invention is to provide a new and improved television receiver in which the sound portion of the television signal can be selectively reproduced locally at the television receiver or can be retransmitted on a radio frequency carrier of an oscillator located adjacent to said television set.

Another object of the invention to is to provide a new and improved television receiver for generating the sound portion of the television signal on a radio frequency carrier to be received by broadcast band receivers.

The invention together with further objects and advantages thereof, may be best understood, by reference to the following description when taken in conjunction with the accompanying drawings, in which.

Figure 1:
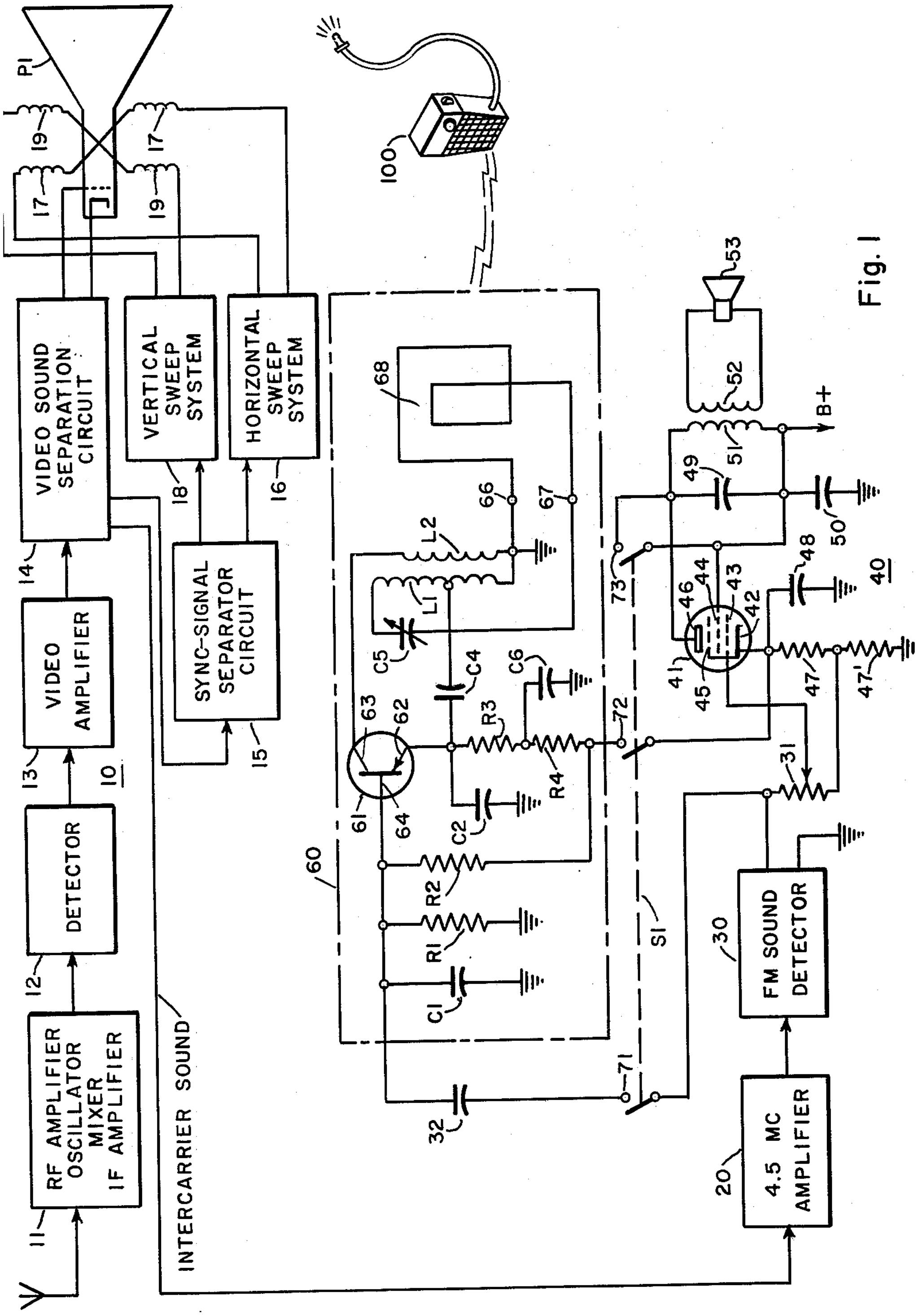
FIGURE 1 is a schematic diagram of a television receiver, partially in block form, illustrating one embodiment of the invention.

The embodiment of the invention illustrated in FIGURE 1 includes a television receiver having a conventional radio frequency receiving section for receiving the picture carrier having video information thereon and the sound carrier having sound information thereon. As is done in the present television transmitting systems, the sound carrier is spaced 4.5 megacycles from the picture carrier. The radio frequency sound receiving demodulating sections of this receiver illustrated in FIGURE 1 are conventional and for this reason they are shown in block diagram form. The picture carrier amplified with amplitude modulated video information and the sound carrier frequency modulated with sound information are received through the radio frequency section 10 of the television receiver and are amplified by the radio frequency amplifier, which signal is then heterodyned in a mixer and the intermediate frequency resulting therefrom is amplified by an IF amplifier. These functions are illustrated in block 11 of FIGURE 1. The intermediate frequency of the composite television signal is then applied to a second detector 12 which demodulates the radio frequency picture carrier and the sound information. The output of the second detector 12 is applied to the video amplifier 13 for amplification thereof. As in the conventional television receiver, the output circuit of the video amplifier is a video sound separation circuit 14 which filters out the 4.5 megacycle intercarrier sound signal and the video information. The video or picture information from the separation circuit 14 is applied to a visual display device such as a cathode ray tube P1. The composite picture signal or video signal is applied to the syncs separator circuit 15 to obtain the vertical and horizontal sync pulses therefrom. These pulses are applied to the vertical and the horizontal sweep circuits 18 and 16 to provide the deflection signal for the vertical deflection coils 19 and the horizontal deflection coils 17. The above described circuits are conventional in form and can be understood form no part of the present invention.

As in a conventional television receiver, the 4.5 megacycle intercarrier sound is supplied from the video sound separation circuit 14 to a 4.5 megacycle amplifier 20. The output of the amplifier 20 is applied to an FM sound detector 30 to provide demodulation of the frequency modulated 4.5 megacycle intercarrier sound signal. The audio output from the detector 30 is applied to the potentiometer volume control 31 and then to the power output amplifier 40. In the embodiment of the present invention, a switch S1 having contacts 71, 72 and 73 are employed. When the switch S1 is opened so that contacts 71, 72 and 73 are open, the amplifier 40 operates as a conventional power output amplifier to provide or reproduce the television sound signal at a speaker 53. When the switch S1 is closed, however, the circuit of amplifier 40 is utilized to supply the required power to an oscillator 60 and also modulates the carrier produced by the oscillator with the sound or audio signal. The tube 41 acts as a dropping resistor when the circuit is first turned on and the tube resistance is high compared to 47 and 47′ and the voltage to the transistor oscillator starts from 0. This signal can then be received by any conventional broadcast band reciever 100.

The audio amplifier 40 includes a pentode 41 having a cathode or emitter electrode 42, a control electrode or grid 43, a screen grid 44, a suppressor grid 45 and an anode or plate 46. The cathode or emitter bias is provided to the cathode 42 by a cathode resistor 47 and 47′ and a bypass cathode capacitor 48. The capacitor 49 is connected across primary 51. An output transformer having a primary winding 51 and a secondary winding 52 are provided in the plate circuit of the tube with the bypass capacitor 50 and a suitable B+ voltage supply. When the switch S1 is open, the secondary of the audio output transformer 52 provides the audio signal to a conventional speaker 53. As shown in FIG. 1, the variable contact of the volume control 31 is connected to the control grid 43.

The oscillator 60 comprises a grounded base transistor oscillator constructed to operate in an ambient temperature of 55° C. such as encountered in television receivers since the oscillator 60 will be located usually adjacent the television chassis. The oscillator 60 includes a transistor 61 having an emitter electrode 62, a base electrode 64 and a collector electrode 63. A coupling capacitor 32 is provided between switch contacts 71 and the base 64 of transistor 61 to provide A.-C. coupling of the sound signal from volume control 31 to the base 64. Capacitor C1 is a low impedance bypass for the base 64 at the frequency of oscillation of the oscillator 60. The capacitor C1 is connected between base 64 and ground. Resistor R1 is connected between the base 64 and ground, whereas a resistor R2 is connected between base 64 and one of the contacts 72 of switch S1. When the contacts 72 of switch S1 are closed, resistors R1 and R2 provide the bias for transistor 61. Resistor R3 is connected between the emitter 62 and another resistor R4 which is in turn connected to one of the contacts 72 of switch S1. Capacitor C2 is connected between the emitter 62 and ground whereas capacitor C6 is connected at a point between resistors R3 and R4 and ground. An inductance L2 is connected between collector 63 and ground whereas inductance L1 is connected between ground and the variable tuning condenser C5. Two antenna terminals 66 and 67 are employed with terminal 67 being connected to the tuning condenser C5 and terminal 66 being connected to ground. With this circuit configuration, the antenna 68, which is a loop antenna, is connected in series with the oscillator tank circuit to provide the maixmum radio magnetic field within the FCC limits. The area and number of turns will determine the amount of radiation. Capacitor C4 is connected between a tap on inductance L1 and the emitter 62. Capacitor C1 determines the high frequency audio response of the modulation system since the source impedance of the audio voltage is high.

Capacitors C2 and C4 provide the proper feedback for the oscillator to give a uniform output voltage across the tuning range. The radio frequency feedback voltage as well as audio modulation is developed across resistor R3. The ratio of resistors R1 and R2 to resistors R3 and R4 determines the oscillator stability with changes in ambient temperature. The ratio of resistor R3 to R4 determines the modulation percentage. Capacitor C6 determines the low frequency audio response of the modulation system.

The oscillator 60 has been designed to operate in the frequency range of 600 to 1000 kilocycles so that it is capable of transmitting sound information on this carrier to be received by a conventional broadcast band receiver. The following values of this circuit were used to provide such a carrier:

| | |
|---|---|
| Capacitor 32 | .01 microfarad. |
| Capacitor C1 | .0047 microfarad. |
| Resistor R1 | 33,000 ohms. |
| Resistor R2 | 33,000 ohms. |
| Resistor R3 | 820 ohms. |
| Resistor R4 | 1,800 ohms. |
| Capacitor C2 | .022 microfarad. |
| Capacitor C4 | .01 microfarad. |
| Inductance L1, L2 | To tune to the desired frequency. |
| Condenser (variable tuning) C5. | 50–240 microfarad (variable). |
| Transistor 61 | 2N1524. |
| Antenna 68 | The loop antenna 50 inches per turn, 6 turns. |
| Resistor 31 | Volume control 500KΩ. |
| Resistor 47 | 330Ω1w. |
| Resistor 47′ | 220Ω1w. |

When switch S1 is open, the audio amplifier 40 will operate as the conventional audio amplifier for the sound channel of a television receiver to produce locally at the television set the audio of the television sound by applying the amplified signal to the speaker 53. When the switch S1 is closed, closing contacts 71, 72 and 73, the conventional sound channel of the television receiver is deactivated and the amplifier 40 then serves as a power supply for the oscillator 60 to produce a radio frequency carrier electromagnetic signal which is modulated by the sound portion of the television signal. This radio frequency carrier is preferably in the broadcast band so that it can be received by a conventional radio receiver such as a transistorized portable radio receiver 100 shown in FIGURE 1. These typical portable radio broadcast receivers are generally adapted to receive the line cord of an earplug so that the speaker of the portable receiver is deactivated and the only signal supplied is that through the earplug. This enables the viewer to view and listen to a television program without disturbing any one in the viewing area.

When contacts 73 are closed, this shorts the signal being applied to the primary 51 of the output transformer so as to prevent the audio signal from being applied to speaker 53.

In addition to deactivating the sound channel, switch S1, upon closure, is responsive to supply biasing power to the oscillator 60. This is effected by the closing of contacts 72 so that the cathode 42 of pentode 41 is then connected to resistors R4 and R2. Hence, by the closure of contacts 72, the capacitor 48 operates as a power supply filter for the transistorized oscillator 60 to provide the necessary power to actuate the oscillator.

In addition, when switches 1 close, thus closing contacts 71, the signal across the volume control 31 is supplied to the base 64 of transistor 61 through a coupling capacitor 32. This results in the broadcast band radio frequency carrier generated by oscillator 60, to be modulated by the sound portion or audio portion of the television signal appearing across volume control 31.

Hence it is seen that by merely adding a simple switch to a conventional audio amplifier of a conventional television receiver, three functions are performed, namely, (1) the audio amplifier sound channel is deactivated, (2) the cathode bypass condenser 48 of the amplifier is employed as the filter to provide a direct current bias voltage which is supplied to the oscillator and (3) the sound portion of the program is connected to the radio frequency oscillator to amplitude modulate the relatively low power radio frequency carrier. As will be understood the oscillator 60 provides relatively low power transmission within the requirements of the FCC for low power communications devices. The antenna 68 is a loop antenna and can be conveniently located in the space below the conventional console type television receiver so as to have approximately six turns with 30 inches per turn.

Figure 2:
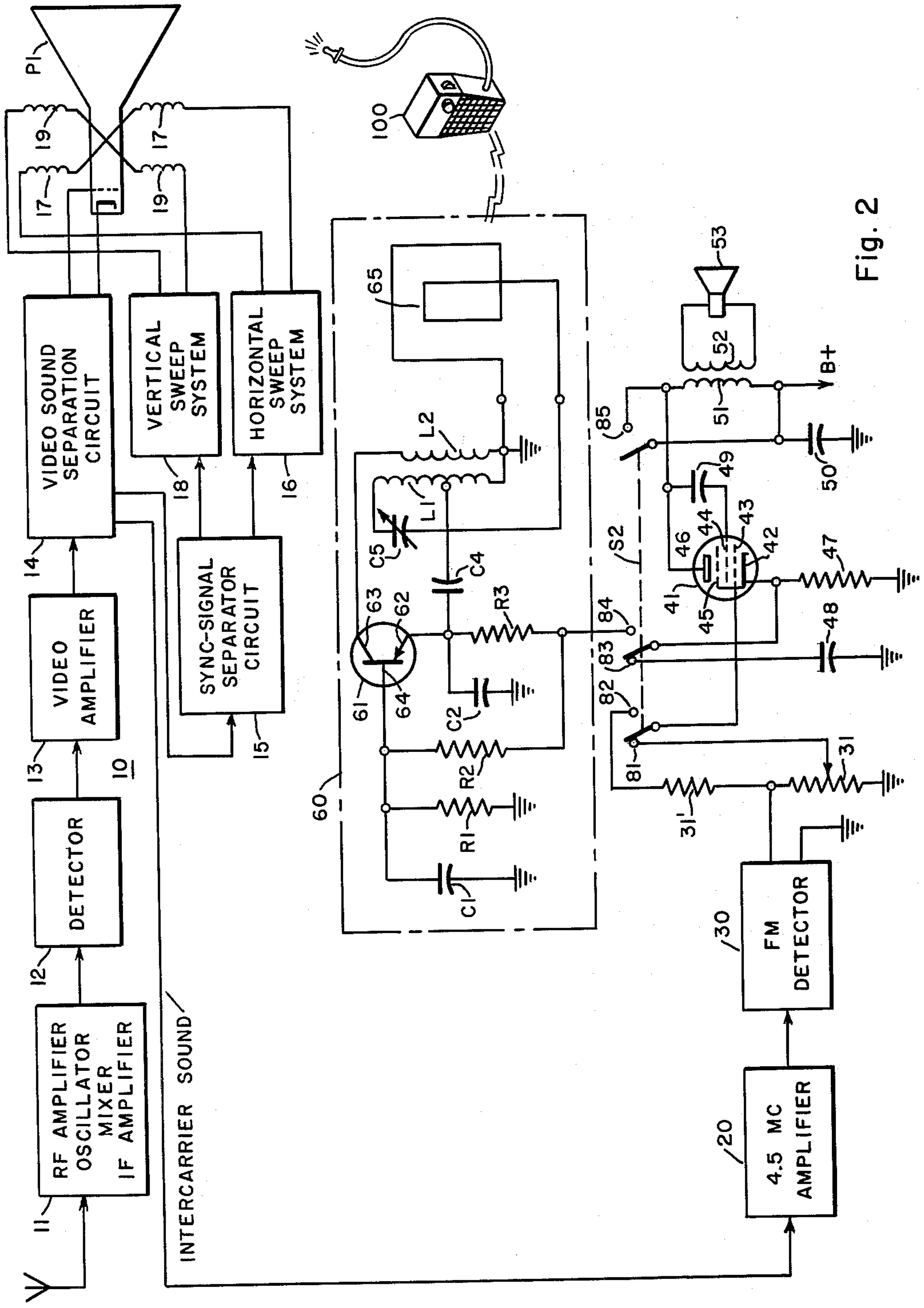
FIG. 2 is a schematic diagram partially in block form of the television receiver illustrating another embodiment in the invention.

FIGURE 2 illustrates another embodiment of the invention which also includes a conventional television audio output amplifier 40 with a low level radio frequency oscillator 60 and a switch S2. When the switch S2 is open, such as is illustrated in FIGURE 2, the audio amplifier 40 will provide the audio signal through the primary 51, the secondary 52 of the output transformer and thence to the speaker 53 to locally reproduce the television sound. When switch S2 is open, as shown in FIG. 2, the amplifier 40 will operate as a conventional power amplifier for the audio portion of the television program. When the switch S2 is closed, however, the oscillator 60 will be actuated to produce low level radio frequency carrier modulated by the sound portion of the television signal, so as to be received by a conventional broadcast band receiver 100. When switch S2 is closed, the contacts 85 are closed to thereby short the primary winding of the output transformer and deactivate the conventional sound channel of the television receiver. In addition, when switch S2 is closed, the cathode bypass capacitor 48 is disconnected from the cathode 42 by opening contact 83. In addition, the cathode 42 is connected to contact 84 of switch S2 so that a modulation voltage is obtained from the cathode 42 to the emitter 62 of the oscillator. By employing emitter modulation, the base path resistors R1 and R2 are made of a relatively low value to provide the proper oscillator stability with ambient temperature. Further when switch S2 is closed, contact 81 is opened and resistor 31′ is connected to the grid 43 through contact 82 so as to switch the grid of the audio tube to a fixed audio drive.

The oscillator 60 is similar to the oscillator 60 shown in FIGURE 1 with the exception of capacitor C6, C6 being omitted. Values of the components therein are the same as set forth for the oscillator in FIG. 1 with the exception of resistors R1 and R2 which can be made smaller, preferably 10,000 ohms each.

Hence by closing switch S2, it is seen that (1) the conventional television sound channel is deactivated and (2) the cathode bypass condenser is removed from the circuit and the cathode 42 is connected to the resistor R3 so as to provide to the oscillator 60 the necessary biasing power which is modulated by the television sound so as to provide emitter modulation of the oscillator 60. In addition, contact 81 is open and contact 82 closed so that resistor 31′ is placed in the circuit between the grid 43 and volume control 31 to provide a fixed audio drive so that the volume control will not affect the modulation percentage of the oscillator 60. Typical values of the oscillator 60 are:

| | |
|---|---|
| Capacitor C1 | .0047 microfarad. |
| Resistance R1 | 10,000 ohms. |
| Resistor R2 | 10,000 ohms. |
| Capacitor C2 | .022 microfarad. |
| Resistor R3 | 1,000 ohms. |
| Condenser capacitor C4 | .01 microfarad. |
| Capacitor C5 | 50–240 micromicrofarads. |
| Inductance L1, L2 | To tune to the desired frequency. |
| Transistor 61 | 2N154. |

The loop antenna 65 is similar to the loop antenna described in the embodiment of FIGURE 1.

Figure 3:
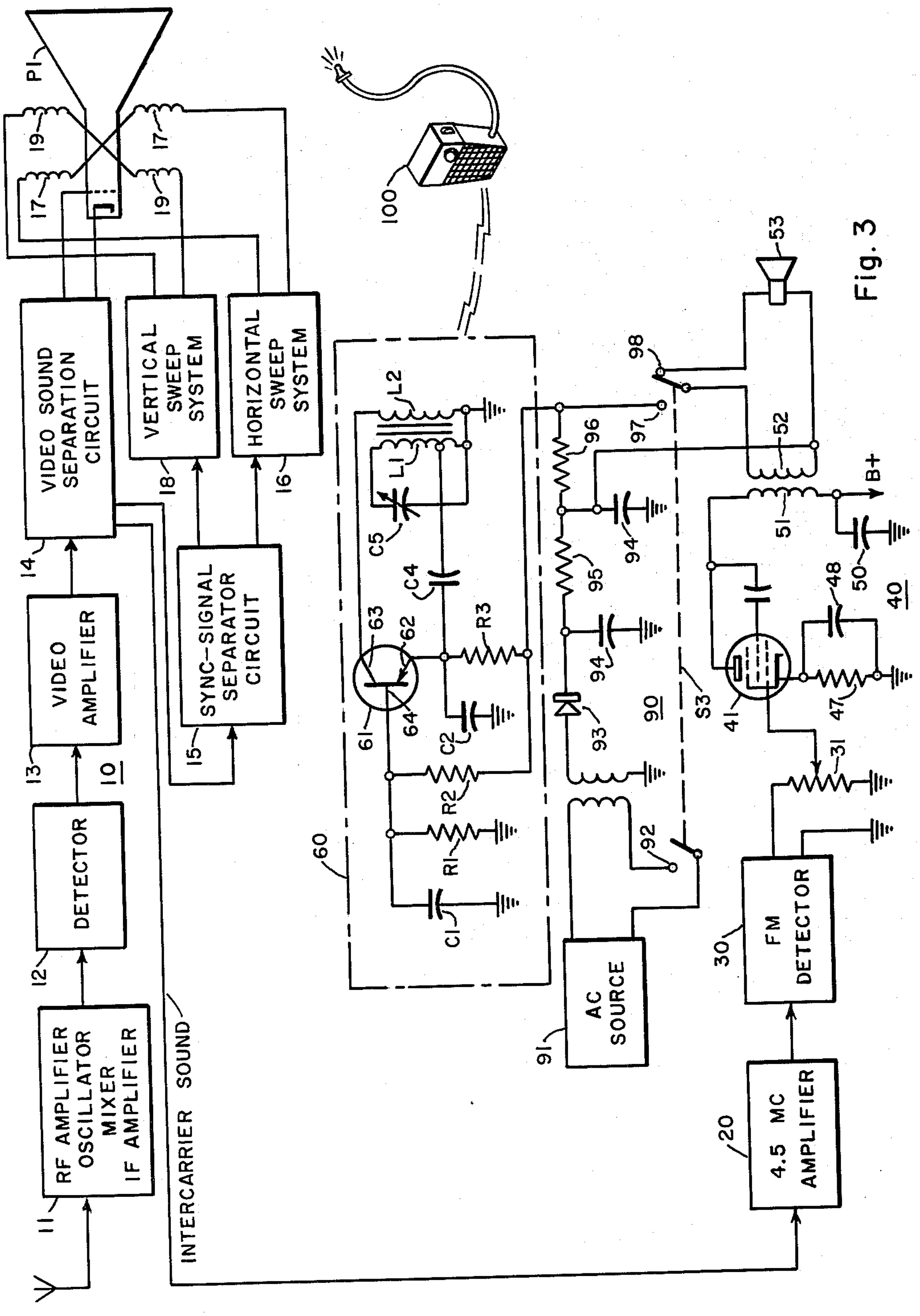
FIG. 3 is a schematic diagram partially in block form of a television receiver illustrating another embodiment of the invention.

FIGURE 3 illustrates an embodiment of the invention which can be employed when it is desired to provide the low level radio frequency transmission of the television sound by only making connections to the speaker leads of an existing television receiver. When a selector switch S3 is open as shown in FIG. 3, the previously described audio amplifier 40 will operate as a conventional audio amplifier to provide local reproduction by the television speaker 53. When the switch S3 is closed, however, the secondary 53 of the output transformer will be connected to a separate direct-current voltage supply 90 to impose the sound portion thereof on the direct-current voltage supply so as to emitter modulate the oscillator 60 with the sound portion of the television program. The external power supply source 90 comprises a source of alternating current 91 which is connected through contacts 92 to a transformer which is connected to a conventional half-wave rectifier and filter comprising a diode or rectifier 93 with filter capacitors 94. Resistance 95 is connected between the filter capacitors 94 with a resistor 96 being connected between resistor 95 and resistance R3 of oscillator 60. When the switch S3 is closed, contacts 92 provide alternating current to the rectifier 93 and the filter including filter capacitors 94 to provide a direct-current voltage supply cross resistance 96. Further, when switch S3 is closed, contact 98 is opened to deactivate receiver and contact 97 is closed so as to connect the secondary 53 of the output transformer across the resistor 96. By so doing, the sound portion of the television receiver is imposed upon the direct voltage generated across resistor 96. Therefore, the oscillator 60 will be supplied with a direct-current voltage or biasing power necessary for actuating this oscillator. The direct current voltage supplied by the power supply 90 will have imposed thereon the sound information so as to provide emitter modulation of the oscillator 60.

The operation of the oscillator 60 is similar to the oscillator illustrated in FIGURE 2 having the same component values as those set forth above for the oscillator 60 shown in FIG. 2.

Hence the embodiment of the invention illustrated in FIGURE 3, when switch S3 is closed, the oscillator 60 will provide radio frequency transmission, by amplitude modulation, of the sound of the television receiver, in the broadcast band so as to be received by any suitable conventional broadcast receiver. The embodiment illustrated in FIGURE 3 can be easily adapted to already available or existing television sets merely by connecting the speaker leads of the television set to the power supply 90 for the oscillator 60. The alternating current source 91 can be from any convenient alternating current source.

Figure 4:
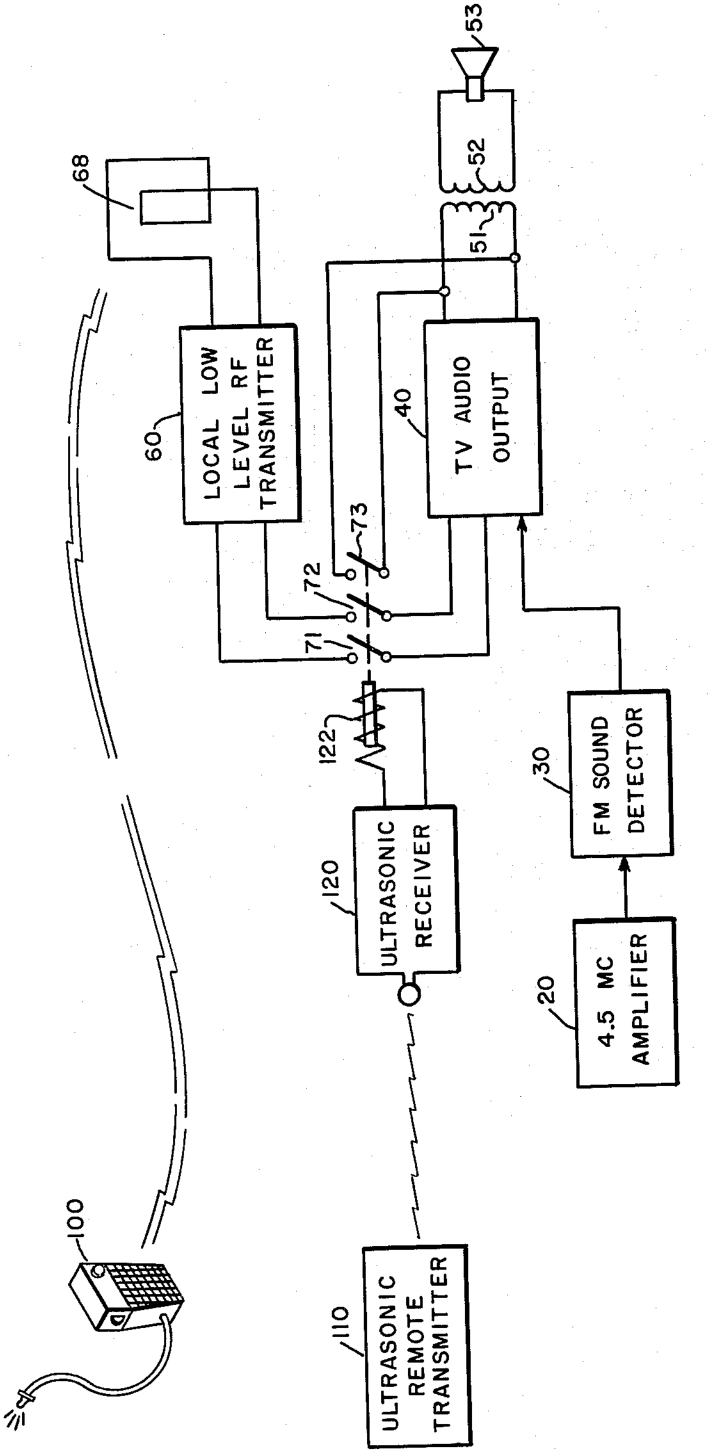
FIG. 4 is a block diagram of a remote control system for a television receiver embodying the invention.

FIGURE 4 illustrates an embodiment of the invention utilizing a remote control ultrasonic transmitter to deactivate the conventional audio output of the television receiver and activate the local low level radio frequency transmitter 60. By this system, a viewer may remotely switch the sound of the television receiver from reproduction of the sound of the television set to reproduction of the sound through a broadcast band receiver adjacent the viewer.

Such a remote control system is particularly advantageous when one of the viewers desires to switch the sound to an adjacent broadcast receiver but is unable or unwilling to operate the controls on the television receiver. Such is the case in a typical semiprivate hospital room such as shown wherein a patient after a period of viewing television programs decides that he wants to retire. Another patient then may utilize an ultrasonic remote control transmitter 110 to switch from local reproduction of the sound at the television receiver and actuate the oscillator 60 in television receiver and thereby transmit, in the broadcast band, the television sound to a conventional portable transistor radio 110 located adjacent to the other patient. By the use of the conventional earplug the patient may then hear the sound without disturbing the other patient. In such a system, the ultrasonic remote control transmitters 110, shown in FIG. 4, is of any acceptable or conventional type that will produce ultrasonic compressional wave signals, preferably having a frequency between 30 and 50 kilocycles. Located in the television set is an ultrasonic receiver 120 having a microphone 121 adapted to receive the compressional airwave signals transmitted by the transmitter 110, which receiver is sensitive to the signals of the predetermined frequency transmitted by the transmitter. When the receiver 120 receives the ultrasonic signals from transmitter 110, through microphone 121, it will actuate a relay or solenoid 122 to thereby close the switch contacts of any of the indicated embodiments illustrated in FIGURES 1, 2 and 3. As shown in FIGURE 4, when the embodiment illustrated in FIG. 1 is utilized with remote control the switch contacts of the switch S1 of the embodiment shown in FIG. 1, namely 71, 72 and 73 are as shown. Hence, when the solenoid 122 is actuated by the ultrasonic transmitter 110, these contacts 71, 72 and 83 will close to thereby provide the output of the volume control 31 onto the base 64 of the transmitter 60 through contacts 71. It also connects the cathode 42 to the resistor R4 of oscillator 60 through contacts 72 to provide a direct current voltage supply therefor. Further, contacts 73 will be closed to prevent speaker 53 from reproducing the TV sound. Hence, when relay 122 is actuated, the local low level radio frequency oscillator 60 will transmit in the broadcast band the sound portion of the television which can be received by adjusting the tuning dial of the radio receiver 100.

It will be understood in all the embodiments shown in FIGURES 1 through 3 that the variable capacitor C5 is adjusted at the television set by the user so that the carrier frequency of the oscillator 60 will be at a point on the broadcast receiver band when there are no other interfering stations.

While particular embodiments of the present invention have been shown and described, it is apparent that changes and modifications may be made without departing from the spirit and scope of the invention.

I claim as my invention:

1. A television receiver adapted to receive a picture carrier amplitude modulated with video information and for concurrently receiving a sound carrier having a fixed frequency separation from said picture carrier and frequency modulated with sound information comprising, means for demodulating said picture carrier to obtain said video information, picture reproducing means, means for applying said video information to said picture reproducing means to obtain a visual display thereon, means for demodulating said sound carrier for obtaining said sound information, sound amplifying means for amplifying said sound information, sound reproducing means, radio frequency transmission means for locally transmitting said sound information on a low power radio frequency carrier, means for selectively (1) actuating said transmitting means for applying biasing power thereto from said sound amplifying means for locally transmitting said sound information on the radio frequency carrier thereof, or (2) connecting said sound amplifying means to said sound reproducing means for reproducing said sound information thereby.

2. A television receiver adapted to receive a picture carrier amplitude modulated with video information and for concurrently receiving a sound carrier having a fixed frequency separation from said picture carrier and frequency modulated with sound information comprising, means for demodulating said picture carrier to obtain video information, picture reproducing means, means for applying said video information to said reproducing means, to obtain a visual display thereon, means for demodulating said sound carrier to obtain said sound information, sound amplifying means for amplifying said sound information and including an electron device having a plurality of electrodes, an impedance connected to one of said electrodes for developing biasing power thereacross, radio frequency transmitting means for locally transmitting said sound information on a low power radio frequency carrier, means for selectively (1) connecting the one of said electrodes to said transmitting means to supply biasing power thereto and transmit said sound information on the radio frequency carrier of said radio frequency transmitting means, or (2) apply said sound information to said sound reproducing means.

3. A television receiver adapted to receive a picture carrier amplitude modulated with video information and for concurrently receiving a sound carrier having a fixed frequency separation from said picture carrier and frequency modulated with sound information comprising, means for demodulating said picture carrier to obtain said video information, picture reproducing means, means for applying said video information to said picture reproducing means to obtain a visual display thereon, means for demodulating said sound carrier for obtaining said sound information, sound amplifying means including an electron device having at least a cathode electrode, a control electrode and an anode electrode, sound reproducing means, radio frequency transmitting means for locally transmitting said sound information on a low power radio frequency carrier, means for selectively (1) applying said sound information to said radio frequency transmitting means and connecting said electron device in cathode follower relationship to said radio frequency transmitting means for supplying biasing power thereto for transmission of said sound information on said radio frequency carrier, or (2) applying said sound information from said sound amplifying means to said sound reproducing means.

4. A televsision receiver adapted to receive a picture carrier amplitude modulated with video information and for concurrently receiving a sound carrier having a fixed frequency separation from said picture carrier and frequency modulated with sound information comprising, means for demodulating said picture carrier to obtain said video information, picture reproducing means, means for applying said video information to said picture reproducing means, to obtain a visual display thereon, means for demodulating said sound carrier for obtaining said sound information, sound amplifying means for amplifying said sound information including an electron device having at least a cathode electrode, a control electrode and an anode electrode, capacitance means and cathode impedance means connected to said cathode electrode in parallel relationship to provide cathode bias to said electron device, sound reproducing means, radio frequency transmission means for locally transmitting sound information on a low power level radio frequency carrier, means for selectively (1) modulating said radio frequency carrier with said sound information, disconnecting said capacitance means from said cathode electrode, and connecting said cathode electrode to said radio frequency transmitting means to provide a direct current voltage supply thereto, or (2) connecting said sound amplifying means to said sound reproducing means for local reproduction of said sound.

5. A television receiver adapted to receive a picture carrier amplitude modulated with video information and for concurrently receiving a sound carrier having a fixed frequency separation from said picture carrier and frequency modulated with sound information comprising, video demodulating means for demodulating said picture carrier to obtain said video information, picture reproducing means, means for applying said video information to said picture reproducing means to obtain a visual display thereon, sound demodulating means for demodulating said sound carrier for obtaining said sound information, sound amplifying means for amplifying said sound information including an electron device having a plurality of electrodes one of said electrodes having a resistor and capacitor connected thereto for developing bias power thereacross, sound reproducing means, radio frequency transmitting means for locally transmitting sound information on a low power radio frequency carrier, means for selectively (1) connecting the one of said electrodes to said transmitting means to supply said biasing power thereto and applying said sound information to said transmitting means or (2) applying said amplified sound information to said sound reproducing means.

References Cited by the Examiner

UNITED STATES PATENTS

| | | | |
|---|---|---|---|
| 2,222,761 | 11/1940 | Biezer et al. | 325—36 |
| 2,275,610 | 3/1942 | Bucky | 325—36 |

| | | | |
|---|---|---|---|
| 3,080,449 | 3/1963 | Nordby | 178—5.8 |
| 3,128,335 | 4/1964 | Knauer | 178—5.8 |

FOREIGN PATENTS 233,278 2/1961 Australia.

DAVID G. REDINBAUGH, *Primary Examiner.*

R. M. HESSIN, J. A. O'BRIEN, *Assistant Examiners.*